May 1, 1951   J. E. McEVOY   2,550,933
GAS SAMPLING DEVICE
Filed March 16, 1948
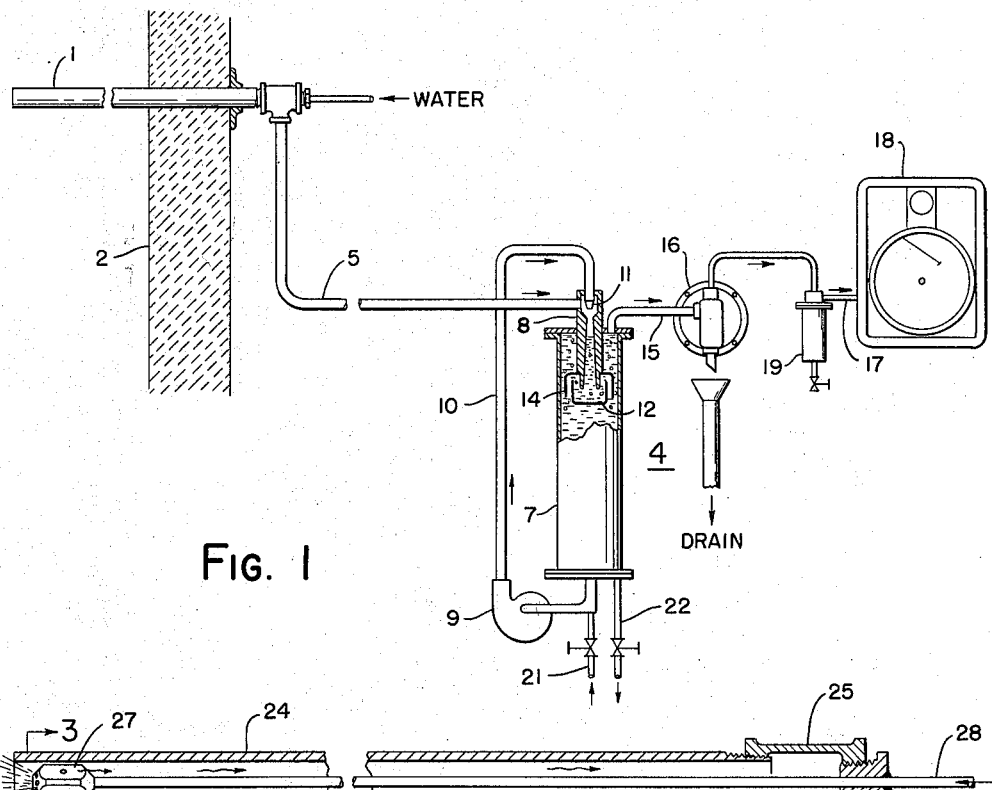
Fig. 1
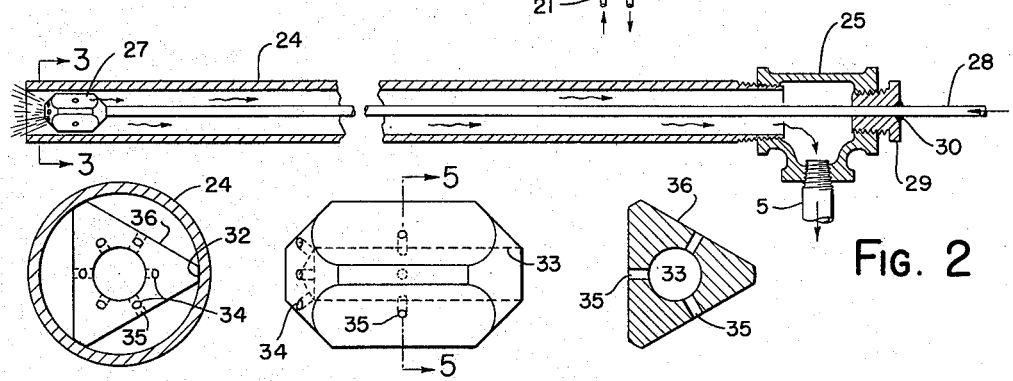
Fig. 2
Fig. 3   Fig. 4   Fig. 5
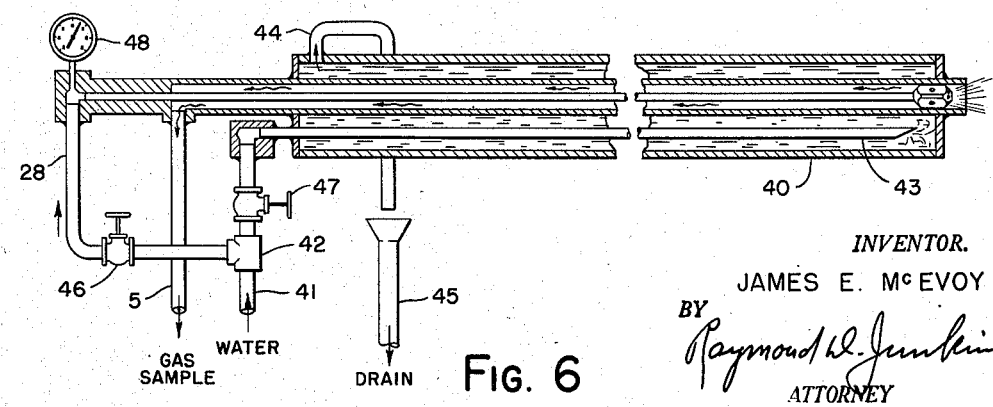
Fig. 6
INVENTOR.
JAMES E. McEVOY
BY Raymond W. Jenkins
ATTORNEY Patented May 1, 1951

2,550,933

UNITED STATES PATENT OFFICE 2,550,933

GAS SAMPLING DEVICE

James E. McEvoy, Cleveland, Ohio, assignor to Bailey Meter Company, a corporation of Delaware Application March 16, 1948, Serial No. 15,091

5 Claims. (Cl. 73—421.5)

1

This invention relates to gas sampling devices, and more particularly to devices for taking the sample of gases formed by the combustion of fuel.

The operation of a furnace, kiln, or any device in which the combustion of fuel takes place is sometimes determined by analyzing the gaseous products of combustion. A sample of the gases is obtained by extending a tube into the furnace or kiln and subjecting it to a suction produced by an aspirator. A large amount of dust is usually carried by the combustion gases, and, in many cases, a substantial amount of moisture is present. While a sample of the gases carrying dust and moisture passes through the portion of the sampling tube extending into the furnace, the temperature of the gases is usually maintained above the dew point of the moisture and no difficulty is experienced. As the sample is conducted from the furnace, the temperature soon drops to the dew point and the moisture condenses on the walls of the passage means. The dust then mixes with the condensed moisture to form mud which soon plugs up the passage. If water is introduced to the passage at the point of plugging for washing the mud toward the aspirator, it will be found that the passage means will then be cooled to the dew point in advance of the point where the water is introduced. Plugging then takes place at a point nearer to the furnace. By introducing water to the sampling tube at a point near its open end, it will be seen that the dust may be wetted to form mud at this point. If the water is directed in a stream opposite to the flow of gases in the tube, the mud may be washed through the open end of the tube back into the furnace. A small amount of water may be introduced to the sample tube near its open end to flow with the gases toward the aspirator so as to carry with it any dust that may settle out of the gases as they flow through the passage means. Before the gases can be analyzed they must be cleaned of foreign matter and then be freed of all moisture. By removing the greater part of the dust at the entrance to the sampling tube, the washing of the gases is greatly simplified.

An object of my invention is to provide an improved means for sampling combustion gases. Another object is to provide an improved gas sampling tube having means for introducing water into the tube near its open end and in a direction opposite to the flow of gases. Still another object is to provide a gas sampling tube containing a nozzle for directing a conical shaped

2 spray of water against its walls near its open end and in a direction opposite to the flow of gases. Yet another object is to provide an improved gas sampling means including a tube having an open end adapted to be received within a furnace, and means for introducing a spray of water into the tube near its open end. Other objects will appear in the course of the following description.

In the accompanying drawing there is shown for purposes of illustration, two forms which my invention may assume in practice.

In these drawings:

Fig. 1 is a schematic diagram of a gas analyzing system incorporating my improved sampling device.

Fig. 2 is an enlarged sectional view of the sampling device shown in Fig. 1.

Fig. 3 is a view looking into the open end of the sampling device of Fig. 2.

Fig. 4 is a side elevational view of the nozzle used in the sampling device.

Fig. 5 is a sectional view taken on the plane of the line 5—5 of Fig. 4.

Fig. 6 is a sectional view of my improved sampling device arranged within a cooling jacket.

My improved sampling device will be described in a system operating continuously to analyze the gaseous products of combustion from a furnace, and providing from the analysis a record of the percentage of free oxygen in the gases as an indication of the completeness of combustion or of the excess air supplied to burn the fuel in the furnace. The system is merely illustrative and is not to be considered limiting in any manner since my invention may be employed for sampling flue gases, exhaust gases from internal combustion engines, etc., and the analysis may be made to determine any desired constituent of the sample.

Referring to Fig. 1 it will be noted that there is shown an open end sampling tube 1 projecting through an opening in the wall 2 of the furnace into the path of the products of combustion. Located at the exterior of the furnace is a mechanism, generally designated 4, communicating with the sampling tube through a conduit 5, and producing an aspirating effect for taking a sample of the gases from the furnace.

The mechanism 4 comprises a tank 7 filled with water and having an aspirator cone 8 at its upper end. A centrifugal pump 9 driven by any suitable means, preferably an electric motor, takes water from the lower end of the tank and discharges it through a pipe 10 to a nozzle 11 at the entrance of the aspirator cone 8. The conduit 5 communicates with the cone in such relation to the nozzle 11 that the pressure flow of water leaving the nozzle and entering the cone produces a suction for drawing gases through the sampling tube in a continuous stream. The mixture of water and gas leaving the cone impinges upon a disintegrator plate 12 completely breaking any bubbles of gas or slugs of water, and assisting in mixing the gas and water in finely divided form. The plate 12 is cupped to reverse the flow of water-gas mixture against an inverted cup 14, whereby the direction of travel of the liquid-gas mixture is again reversed. Emerging downwardly from the annulus formed by the cups 12 and 14, the mixture enters the main body of liquid in the tank and the gas separates from the water and rises to the top of the tank. A conduit 15 delivers the gas from the top of the tank to a separator 16 which removes moisture entrained by the gas. The gas is then conducted by a pipe 17 to an analyzer 18, and a filter 19 may be arranged in the pipe 17, if necessary, to assure the removal of moisture.

The mechanism 4 is desirably located as close to the furnace as is practical and the analyzer 18, although it is shown close to the mechanism 4, may be located at a point distant from the sampling apparatus. It will be appreciated that the system between the mechanism 4 and the analyzer 18 is under pressure, and a small leak in the system would result only in a small loss from an excessively large gas sample. Since there is no possibility for air to enter this portion of the system and change the composition of the gas sample being analyzed, the distance between the apparatus 4 and the analyzer is limited only by the pressure drop and the pressure available from the pump 9.

Because of the turbulence in the tank 7, there is bound to be a substantial amount of water carried through the pipe 15 to the separator 16 and eventually to waste. This liquid must be replaced, and so there is provided a makeup line 21 connected to any suitable source of water and containing a valve which may be left open just enough to supply the makeup necessary. A drain pipe 22 is provided for draining the tank of accumulated foreign matter or for continuously bleeding the tank in small amounts.

The sampling tube 1, as shown in Fig. 2, includes a tubular member 24 connected at one end by a T-shaped coupling 25 to the conduit 5. Supported with the tubular member 24 a short distance from its open end is a nozzle 27 to which water is supplied from any suitable source by a tube 28 extending axially through the member 24 and through an opening in a plug 29 threaded into the coupling. The tube 28 may be soldered to the plug, as shown at 30, for holding the nozzle in the desired position and sealing any clearance about the tube to prevent air from gaining admission to the interior of the member 24 and the conduit 5.

The nozzle 27, as shown in Fig. 3, is triangular in cross section except that the apexes of the triangle are rounded off to provide surfaces 32 engageable with the inner wall of the member 24. The end portions of the nozzle are tapered to a frusto-conical shape, and an axial bore 33 extends through the nozzle from one end to a point spaced short of the other end. Small passages 34 extend from the forward end of the bore 33 through the tapered portion of the nozzle, as shown in Figs. 3 and 4, and other small passages 35 extend radially from the bore 33 and open through the side walls 36 of the nozzle between the ends of the latter.

The openings 34 in the nozzle are arranged to provide a conical shaped spray of water at the open end of the tubular member 24, and the sample gas taken into the tube must pass through the spray. Dust carried with the gases to the opening of the tube is wet by the spray and forms mud on the walls surrounding the opening. The water discharged from the passages 34 impinges upon the wall of the tube and washes the mud through the open end of the tube back into the furnace. Part of the water ejected from the passages 34 is broken up into a fine spray as it strikes the inner surface of the tube, and an effective screen of water is provided for wetting the dust. Water discharged from the nozzle through the passages 35 passes through the tube 24 and the conduit 5 to the aspirating mechanism 4, and any dust carried by the gases beyond the nozzle 27 is washed by this water through the passage means to the aspirator.

When the temperature surrounding the sampling tube is very high, it becomes necessary to provide a cooling jacket so that the water supplied by the tube 28 does not turn to steam before it is ejected from the nozzle 27. Steam ejected from the nozzle would be dry and would fail to produce the necessary wetting of the dust. As shown in Fig. 6, a sampling tube like that of Fig. 2 extends through a cylindrical jacket 40. A water supply line 41 is connected by a coupling 42 to the nozzle tube 28 and to a second tube 43 extending longitudinally through the jacket 40 to the forward end of the latter. Water supplied by the tube 43 fills the jacket and escapes through a connection 44 to a drain pipe 45. Adjustable valves 46 and 47 are provided for regulating the flow of water through the tubes 28 and 43, and a pressure gage 48 is shown in communication with the tube 28 for indicating the pressure at which water is supplied to the nozzle.

While there has been illustrated and described certain embodiments which my invention may assume in practice, it will be understood that it may be modified and embodied in other forms without departing from its spirit or the scope of the appended claims.

What I claim as new and desire to secure by United States Letters Patent, is:

1. A device for sampling gas from a gas flow path comprising, in combination, a tubular member having an open end adapted to be located in the gas flow path, suction means connected to said tubular member at a point spaced from said open end, a nozzle arranged within said tubular member and having spray openings directed toward said open end, said nozzle being substantially polygonal shaped in cross section and having surfaces at the apexes of its periphery engaging the inner wall of said tubular member, and means including a conduit extending axially of said tubular member for supplying fluid under pressure to said nozzle.

2. The device of claim 1 in which openings are provided in the sides of said nozzle between the apexes for directing fluid normal to the inner wall of said tubular member.

3. The device of claim 1 in which said nozzle is arranged within the tubular member adjacent said open end, and the openings in the nozzle arranged to direct a cone shaped spray against the inner wall of the tubular member and in the direction of said open end.

4. A device for sampling gas from a gas flow path comprising, in combination, a tubular member having an open end adapted to be located in the gas flow path, means for closing the opposite end of said tubular member, a jacket surrounding said tubular member between its ends and having fluid tight engagement with the exterior thereof, suction means connected to said tubular member adjacent its closed end, a nozzle arranged within said tubular member adjacent its open end and having openings for directing a conical shaped spray of water toward said open end, a conduit extending axially through said tubular member and connected to said nozzle, a second conduit opening into the interior of said jacket, means for supplying water to said conduits, and a drain connection communicating with said jacket.

5. A device for sampling gas from a gas flow path including, in combination; a tubular member having an open end adapted to be located in the gas flow path; suction means connected to said tubular member at a point spaced from said open end; a nozzle, said nozzle and tubular member being formed to provide means laterally supporting said nozzle within the tubular member adjacent said open end, said nozzle also having openings for directing a spray of water toward said open end, at least one lateral portion extending the length thereof and spaced from the tubular member to define a gas path with the inner wall of the tubular member, and an opening in said lateral portion for directing a stream of water against the wall of said tubular member; and a conduit extending through said tubular member for delivering water under pressure to the nozzle.

JAMES E. McEVOY.

REFERENCES CITED

The following references are of record in the file of this patent:

UNITED STATES PATENTS

| Number | Name | Date |
| --- | --- | --- |
| 199,267 | Conkling | Jan. 15, 1878 |
| 1,017,275 | Walker | Feb. 13, 1912 |
| 1,890,592 | Stein et al. | Dec. 13, 1932 |
| 2,356,845 | Hines | Aug. 29, 1944 |